(No Model.) 2 Sheets—Sheet 1.
F. L. PERRY.
TWO WHEELED VEHICLE.
No. 301,627. Patented July 8, 1884.
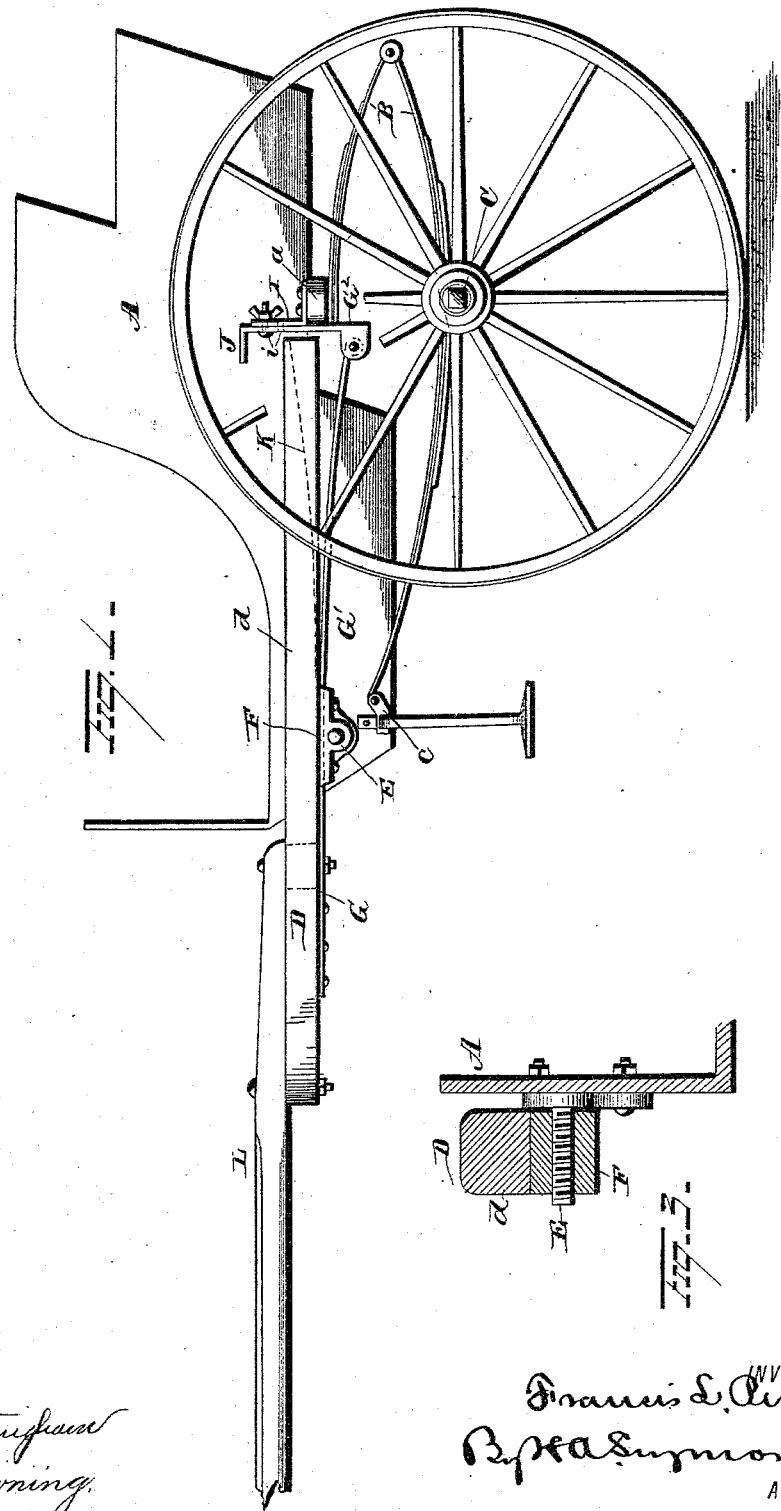
WITNESSES
INVENTOR
Attorney (No Model.)  F. L. PERRY.  2 Sheets—Sheet 2.
TWO WHEELED VEHICLE.
No. 301,627.  Patented July 8, 1884.
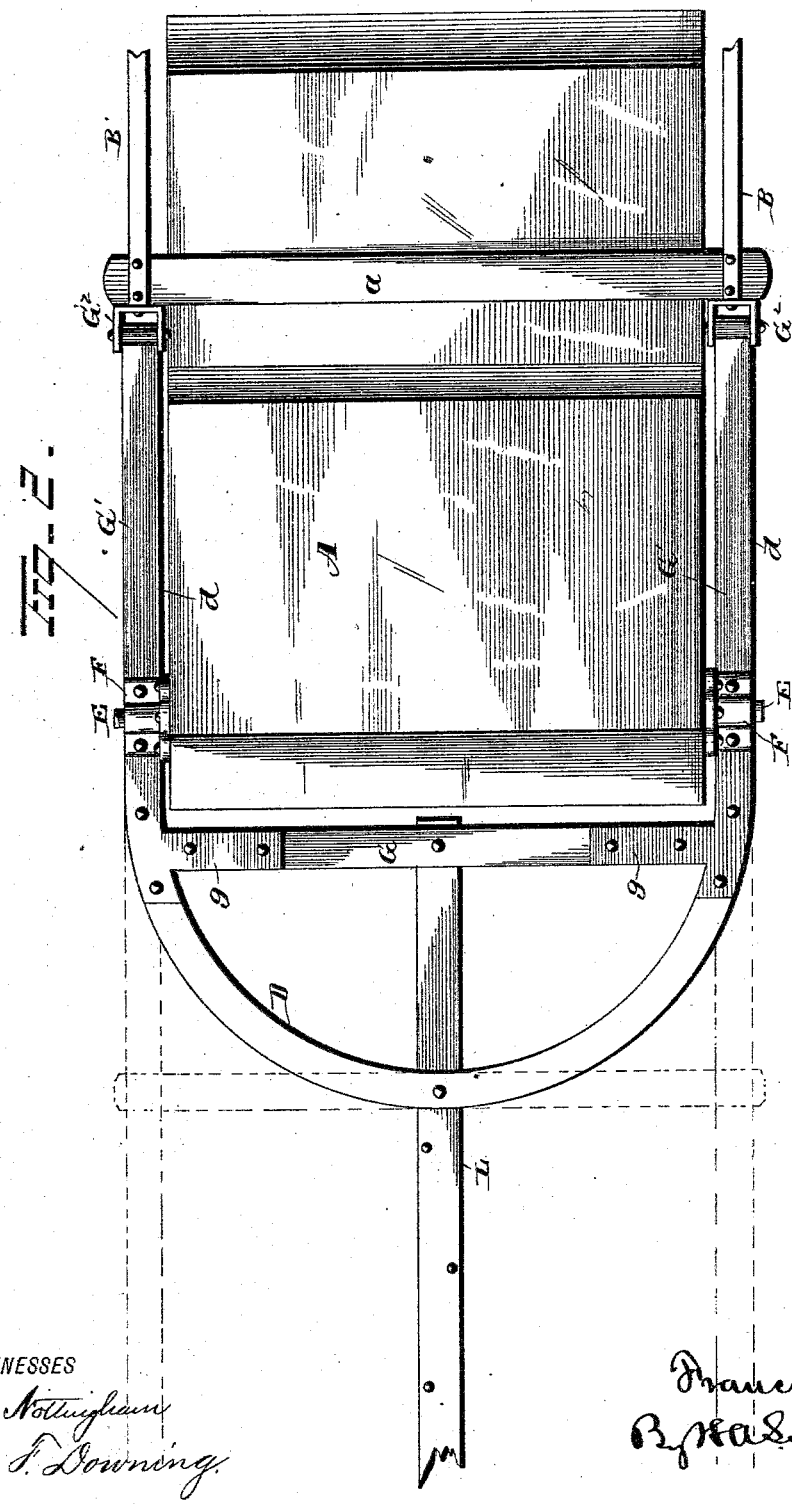
WITNESSES
D. G. Nottingham
Geo. F. Downing
INVENTOR
Francis L. Perry
By H. A. Seymour
Attorney

UNITED STATES PATENT OFFICE.

FRANCIS L. PERRY, OF BRIDGEPORT, CONNECTICUT.

TWO-WHEELED VEHICLE.

SPECIFICATION forming part of Letters Patent No. 301,627, dated July 8, 1884.

Application filed November 7, 1883. (No model.)

*To all whom it may concern:*

Be it known that I, FRANCIS L. PERRY, of Bridgeport, in the county of Fairfield and State of Connecticut, have invented certain new and useful Improvements in Two-Wheeled Vehicles; and I do hereby declare the following to be a full, clear, and exact description of the invention, such as will enable others skilled in the art to which it appertains to make and use the same.

My invention relates to an improvement in two-wheeled vehicles of that type known as dog-carts, sulkies, &c., and has particular reference to an improvement on the invention for which Letters Patent No. 278,041 were granted to me May 22, 1883. In the patent referred to each shaft is pivotally connected to the forward portion of the vehicle-body. To the upper and lower sides of the shaft in rear of its pivotal connection are secured the forward ends of reversely-curved springs, the rear ends of which are allowed a sliding or longitudinal movement in staples attached to a bracket secured to the side of the body. The rear or free end of the shaft extends in rear of the bracket, and is furnished with a lower cushioned bearing formed on the lower arm of the bracket. This construction and arrangement of springs was designed to obviate the transmission of the jerking or horse motion through the shafts to the vehicle-body, and while it answered the purpose to a certain extent, it had certain objectionable features which were due, principally, to the following features of its construction: By the employment of two reversely-curved springs and securing them to the opposite sides of the shaft near its pivotal connection with the body, the shaft would, for a considerable distance in rear of its pivotal bearing, be subjected to the direct contact of said springs, and with springs of sufficient strength and stiffness for ordinary usage, this extended upper and lower bearing operated to prevent the shaft having that free vibratory motion that is necessary in order to effectually prevent the transmission of the horse or jerking motion to the body. Again, when two springs are employed in the manner shown and described in my patent, as aforesaid, they do not afford a continuous bearing for either the upper or lower side of the shaft, but allow the free end of the shaft to strike the bearing on the bracket, and produce a thumping action that is objectionable to the occupant of the vehicle. Other objections not necessary to herein enumerate in full—such as undue expense in manufacture and multiplicity of parts—are attendant on the employment of the improvement shown and described in my patent heretofore specified.

The object of my present invention is to obviate the objectionable features and defects above noted, and with these ends in view I have dispensed with the double-spring connection between the shaft and body, and employ but a single spring to connect each shaft with the body, and arrange the spring in such relation to the shaft that the latter shall have a free vibratory movement, and shall also have a rocking or graduated bearing on the spring, and thus effectually avoid the transmission of the jerking motion to the body of the vehicle.

A further object of my invention is to provide improved means for imparting lateral adjustment to the body, as will be hereinafter described, and set forth in the claims.

In the accompanying drawings, Figure 1 is a side elevation of my improvement. Fig. 2 is a plan view of the under side of the vehicle, the wheels being removed therefrom. Fig. 3 is a detached sectional view of one of the screw-threaded pivotal bearings.

A represents the body of the vehicle, the rear end of which is provided with the cross-bar $a$, to which is secured the forward ends of the elliptic springs B, the rear ends of which are pivoted to the rear ends of the lower elliptic springs, which latter are secured by clips in any desired manner to the axle C, while their forward ends are fastened to or connected with the step-irons $c$.

The pole-frame D consists of a wooden bar or piece bent to the form shown, the side arms, $d$ $d$, of which are located outside of the vehicle-body or within the side thereof, and connected to the forward end of the body, by means of the pivotal bearings E E. These bearings are secured at their inner ends to the forward end of the vehicle body or frame, while their outer ends are screw-threaded and supported in screw-threaded boxes or sleeves F attached to the pole-frame in any desired manner. By means of these screw-threaded bearings the vehicle-body may be secured in any desired lateral adjustment to accommodate it to different widths of pole-frame or shafts, and this adjustment is effected without the employment of nuts or other devices which are liable to become lost or misplaced, as it is only necessary to rotate the screws to move and to retain the body and pole-frame or shafts in their proper relative positions. The pole-frame is provided near its forward end with a cross-bar, G, which is secured at its opposite ends to the sides of the pole-frame, and its attachment strengthened by means of the forward ends of the springs, as will now be described. To the under side of the side pieces of the pole-frame are secured the flat springs G' G', the forward ends of which are provided with the lateral arms g g, which extend over and are secured to the forward cross-bar, G, thereby serving as T-irons to strengthen the frame, and also insuring a firm attachment of the forward ends of said springs to the pole-frames or shafts. The springs G' G' are downwardly curved at their rear ends and secured to bolts, lugs, or links attached to the brackets $G^2$, each of which is provided with a series of holes, i, whereby the bracket may be secured at its rear end in any desired vertical adjustment by means of a set-screw or bolt inserted through any one of said holes in the bracket, and into a corresponding series of holes in a vertical bar or plate, I, attached to the sides of the vehicle body or frame. The upper end of the bracket is provided with a stop, J, for limiting the upward movement of the rear end of the pole-frame or shafts. The lower surfaces of the sides of the pole-frame are beveled or bent to form an elongated upwardly-curved bearing, K, which corresponds to the downward curvature of the springs, or if shafts are employed the rear ends may be straight or curved upward, and act in connection with the downwardly-curved spring to form a rocking and noiseless bearing.

By means of the construction and arrangement of the parts described, the springs may be secured at their rear ends in any desired vertical adjustment to accommodate the pole-frame or shafts to horses of different heights. Again, by the employment of the wide, flat springs downwardly curved at their rear ends, and the elongated upwardly-curved bearings on the sides of the pole-frame or shafts, a long rocking bearing is secured between the pole-frame and the spring, which has the effect of accommodating itself to a long or short gaited horse, and retaining the body perfectly level and steady in its movement, and also obviates any noise or rattle of the parts when the vehicle is in use; also, this construction insures a strong and extended bearing for supporting the weight of a person entering or leaving the vehicle.

It is evident that many slight changes in the construction and arrangement of parts might be resorted to without departing from the spirit of my invention, and hence I would have it understood that I do not limit myself to the exact construction and arrangements of parts shown and described; but, Having fully described my invention, what I claim as new, and desire to secure by Letters Patent, is—

1. In a two-wheeled vehicle, a single-spring connecting medium between the pivoted shaft and the body of the vehicle or its attachments, said spring being attached at or near the pivotal point on the shaft and extending in the same vertical plane therewith, with beveled or inclined bearings for the same, substantially as shown and described.

2. The combination, with a shaft or pole frame pivoted to the forward part of the body or frame, and provided with rearwardly-projecting arms or extensions, of single springs, each secured to the pole or shaft frame at or near its pivotal point and extending rearwardly, where it is secured to the body, the spring and shaft or pole frame extension forming a rocking bearing, substantially as set forth.

3. The combination, with the pole-frame or shaft, and the vehicle-body, of screw-threaded bearings for supporting the body in any desired lateral adjustment, substantially as set forth.

In testimony whereof I have signed this specification in the presence of two subscribing witnesses.

FRANCIS L. PERRY.

Witnesses:
GEO. F. DOWNING,
S. G. NOTTINGHAM.